(12) United States Patent
Johnson et al.

(10) Patent No.: US 8,472,860 B2
(45) Date of Patent: Jun. 25, 2013

(54) ARTIFICIAL INTELLIGENCE SOFTWARE FOR GRADING OF STUDENT PROBLEM-SOLVING WORK

(76) Inventors: Benny G. Johnson, Delmont, PA (US); Dale A. Holder, Russell Springs, KY (US)

( * ) Notice: Subject to any disclaimer, the term of this patent is extended or adjusted under 35 U.S.C. 154(b) by 692 days.

(21) Appl. No.: 12/437,619

(22) Filed: May 8, 2009

(65) Prior Publication Data

US 2009/0286218 A1 Nov. 19, 2009

Related U.S. Application Data

(60) Provisional application No. 61/052,669, filed on May 13, 2008.

(51) Int. Cl.
*G09B 7/00* (2006.01)
(52) U.S. Cl.
USPC ............................ 434/353; 434/349; 434/354
(58) Field of Classification Search
USPC .................. 434/349, 350, 353, 354, 322, 323
See application file for complete search history.

(56) References Cited

U.S. PATENT DOCUMENTS

| 5,259,766 | A | * | 11/1993 | Sack et al. | 434/362 |
| 5,672,060 | A | * | 9/1997 | Poor | 434/322 |
| 5,697,788 | A | * | 12/1997 | Ohta | 434/118 |
| 5,987,302 | A | * | 11/1999 | Driscoll et al. | 434/353 |
| 6,540,520 | B2 | * | 4/2003 | Johnson et al. | 434/322 |
| 2003/0180703 | A1 | | 9/2003 | Yates et al. | |
| 2003/0224340 | A1 | * | 12/2003 | Housman et al. | 434/353 |
| 2004/0191746 | A1 | | 9/2004 | Maron et al. | |
| 2005/0014123 | A1 | * | 1/2005 | Jongsma et al. | 434/353 |
| 2005/0142529 | A1 | | 6/2005 | Andreyev et al. | |
| 2005/0255439 | A1 | | 11/2005 | Cody | |
| 2006/0003296 | A1 | * | 1/2006 | Dockterman | 434/188 |
| 2006/0210957 | A1 | | 9/2006 | Maron | |
| 2006/0228688 | A1 | | 10/2006 | Wong et al. | |
| 2006/0286540 | A1 | * | 12/2006 | Burstein et al. | 434/353 |
| 2009/0253114 | A1 | * | 10/2009 | Herman et al. | 434/354 |

OTHER PUBLICATIONS

Johnson, Benny G. et al., An Artificial Intelligence-Based Program for Automated Grading . . . , The Chemical Educator, Jul. 17, 2003, vol. 8, Issue 4.

* cited by examiner

*Primary Examiner* — Bruk Gebremichael
(74) *Attorney, Agent, or Firm* — McKay & Associates, P.C.

(57) ABSTRACT

Described is a method using a computer for grading student work on a problem when the student's own steps are shown in detail. A reference trace is created representing a best solution path to the problem. A student trace of the student's own work is then created, which involves searching explicitly for a specific rationale for appending a step to the student trace; deeming the step a correct production provided the step was able to be reproduced and marking the step as traced; provisionally accepting the step as part of the best solution path subject to revocation if a better-quality step is later found by a step conflict check; implicitly tracing the student's work to discover implicitly taken mental steps provided the explicit tracing has failed to justify the step; appending any remaining untraced steps to the student trace and excluding them from the best solution path; computing a value of the steps in the student's work to form a student value; and, comparing the student value to a total value of the steps in the reference trace to obtain a score.

12 Claims, 12 Drawing Sheets

```
void CompleteStudentTrace(XML::Node& Trace, const XML::Node& StudentAttempt,
            const StepFinder<OxProblemType>& SF, TraceList& Traces)
{
  bool Tracing;
  XML::NodeList StudentSteps = Trace.find("StudentStep");
  do {
    Tracing = false;
    for (XML::NodeList::iterator it = StudentSteps.begin(); it != StudentSteps.end(); ++it) {
      XML::Node S = *it;
      if (!IsTraced(S)) {
//TRACE("Trying to trace step: %s\n",S("Input").getText().c_str());

// Try to trace the step in order of increasing complexity of match

// If step is uninterpretable, mark as not accepted
      if (!IsInterpretable(S))
        AddTracedStepNotAccepted(Trace,S);

if (!IsTraced(S)) {
        // Generate solution so far and conflict set so we can perform tests
        ProblemSolution<OxProblemType> Sol = GenerateSolution(Trace);
        std::vector<OxProblemStep::const_ptr> CS = SF(Sol.state());

// Check for applicable step (production match or action match)
        if (TraceProductionStep(S,Sol.problem(),CS)
          || TraceApplicableStep(S,Sol.problem(),CS))
          AddTracedStepAccepted(Trace,S,SF);

if (!IsTraced(S)) {
        // Step is not currently applicable
        // See if this step is redundant with a previously accepted traced step - if so,
        // we can trace it // First check if step is identical to a previously accepted traced step - if so,
        // don't have to accept it int j;
        for (j = NTracedSteps(Trace)-1; j >= 0; --j) {
          const XML::Node T = GetTracedStep(Trace,j);
          if (IsAccepted(T) && IdenticalSteps(S,T)) {
          ASSERT(T.getName() == "StudentStep");
           AddTracedStepNotAccepted(Trace,S);
           MarkRedundant(S,T);
           break;
          }
        }
```

FIG. 5

```
        // If that didn't work, check for conflict with previously accepted step if (!IsTraced(S)) {
          StepMatchApplicationPred SMAP(S,Sol.problem());
          for (j = NTracedSteps(Trace)-1; j >= 0; --j) {
            XML::Node T = GetTracedStep(Trace,j);
            if (IsAccepted(T) && SMAP(T)) {
          ASSERT(T.getName() == "StudentStep");
              ResolveConflictingSteps(S,T,Trace,SF,Traces);
              break;
            }
          }
        }
      }
    } if (IsTraced(S)) {
      Tracing = true;
      break; // Start again from top to preserve student's step order as closely as possible
    }
  }
} if (!Tracing) {
  // If all else fails, try to insert an implicit step
  ProblemSolution<OxProblemType> Sol = GenerateSolution(Trace);
  std::vector<OxProblemStep::const_ptr> CS = SF(Sol.state());
  for (XML::NodeList::iterator it = StudentSteps.begin();
       it != StudentSteps.end() && !Tracing; ++it) {
    if (!IsTraced(*it))
      Tracing = TraceImplicitStep(*it,Trace,Sol,CS,SF);
  }
}

} while (Tracing);
// Any untraced steps remaining are simply rejected - couldn't make any sense out of them
for (XML::NodeList::iterator it = StudentSteps.begin(); it != StudentSteps.end(); ++it)
  if (!IsTraced(*it))
    AddTracedStepNotAccepted(Trace,*it);

// Characterize solution as to completeness and correctness
ProblemSolution<OxProblemType> Sol = GenerateSolution(Trace);
bool SolutionIsComplete = Sol.isComplete();
Trace.addChild("SolutionIsComplete").setText(SolutionIsComplete);
bool SolutionIsCorrect = SolutionIsComplete;
if (SolutionIsComplete)
```

FIG. 6

```
{
  const XML::NodeList AS = GetAcceptedSteps(Trace);

for (XML::NodeList::const_iterator it = AS.begin(); it != AS.end() && SolutionIsCorrect; ++it)
    SolutionIsCorrect &= IsCorrect(*it);
}
Trace.addChild("SolutionIsCorrect").setText(SolutionIsCorrect);
```

FIG. 7

```
void ResolveConflictingSteps(XML::Node& S, XML::Node& SPrev, XML::Node& Trace,
            const StepFinder<OxProblemType>& SF, TraceList& Traces)
{
 // We must determine which of the conflicting steps, S or SPrev, deserves to be accepted,
 // or whether they are equivalent at this level of inspection, in which case we accept both
 // on a trial basis and let the scoring mechanism ultimately sort them out // Build the partial solution up to the previous step and generate conflict set //TRACE("# previous steps: %d\n",GetTraceOrder(SPrev));
 ProblemSolution<OxProblemType> Sol = GenerateSolution(Trace,GetTraceOrder(SPrev));
 std::vector<OxProblemStep::const_ptr> CS = SF(Sol.state());

// Check correctness of both steps
 // !!! Note this currently only checks production, not correctness !!!

bool PrevCorrect = IsProduction(SPrev);
 StepMatchProductionPred SMPP(S,Sol.problem());
 SMPP.setStrict(false);
 vector<OxProblemStep::const_ptr>::const_iterator it = find_if(CS.begin(), CS.end(), SMPP);
 bool CurrCorrect = it != CS.end();

if (PrevCorrect && !CurrCorrect) {

// Case 1: Previous step is correct and current step is not correct
 TRACE("Case 1: Step %s inferior to step %s\n",S("Input").getText().c_str(),
    SPrev("OxProblemStep").getText().c_str());

// Current step is not accepted, end of story

AddTracedStepNotAccepted(Trace,S);
  MarkRedundant(S,SPrev);
 }
 else if (!PrevCorrect && CurrCorrect) {

// Case 2: Previous step is not correct and current step is correct
 TRACE("Case 2: Step %s replaces step %s\n",S("Input").getText().c_str(),
    SPrev("OxProblemStep").getText().c_str());

// Replace acceptance of previous step with current step in trace

// Invalidate acceptance of previous step and mark as superseded
  InvalidateAcceptance(Trace,SPrev);
  MarkSuperseded(SPrev,S);
```

FIG. 8

```
// Trace and accept current step
  bool TP = TraceProductionStep(S,Sol.problem(),CS);
  ASSERT(TP);
  AddTracedStepAccepted(Trace,S,SF);
 }
 else {

// Case 3: Previous step and current step are equivalent (either both correct or not correct)

// Create two paths, each accepting a different step

// Clone trace for second path
XML::Document Trace2Doc;
XML::Node Trace2 = Trace2Doc.importRootNode(Trace);

// Path 1: Current step is not accepted

AddTracedStepNotAccepted(Trace,S);
MarkRedundant(S,SPrev);

// Path 2: Current step is accepted

// Invalidate acceptance of previous step
InvalidateAcceptance(Trace2,GetTracedStep(Trace2,GetTraceOrder(SPrev)));
XML::Node ID = GetStepIDNode(S);
XML::Node SPrev2 = GetTracedStep(Trace2,GetTraceOrder(SPrev));
XML::Node S2 = GetStep(Trace2,ID);
MarkSuperseded(SPrev2,S2);
// Trace and accept current step
bool TP = TraceProductionStep(S2,Sol.problem(),CS)
     || TraceApplicableStep(S2,Sol.problem(),CS);
ASSERT(TP);
AddTracedStepAccepted(Trace2,S2,SF);

// Add new path to list of candidate traces
 Traces.push_back(Trace2Doc);
 }
}

// ********* Secondary function ********** void InvalidateAcceptance(XML::Node& Trace, XML::Node S)
{
 ASSERT(IsAccepted(S));
```

FIG. 9

```
// Change acceptance of step to false

S("Accepted").setText(false);

// Invalidate tracing of any steps that follow the given step in the trace int TraceOrder = GetTraceOrder(S);
int NFollowingSteps = NTracedSteps(Trace) - TraceOrder - 1;
for (int i = 0; i < NFollowingSteps; ++i) {
 XML::Node T = GetTracedStep(Trace,TraceOrder+1);
 ASSERT(T.getName() == "StudentStep"); // !!! Can't handle implicit steps yet - have to delete them
 UntraceStep(T);
 ostringstream XPath;
 XPath << "TraceOrder/*[" << TraceOrder+2 << "]";
 Trace("TraceOrder").removeChild(Trace(XPath.str()));
}

// If an implicit step was necessary to enable this step, invalidate its acceptance as well if (TraceOrder > 0) {
 ostringstream XPath;
 XPath << "TraceOrder/*[" << TraceOrder << "]";
 XML::Node IDPrev = Trace(XPath.str());
 if (IDPrev.getName() == "ImplicitStep") {
  ASSERT(false); // Interesting to see under what circumstances this comes up
  XML::Node SPrev = GetStep(Trace,IDPrev);
  SPrev("Accepted").setText(false);
  Trace("TraceOrder").removeChild(IDPrev);
  S("TraceOrder").setText(TraceOrder-1);
 }
}
}
```

FIG. 10

```
bool TraceImplicitStep(XML::Node& S, XML::Node& Trace, const ProblemSolution<OxProblemType>& Sol,
            const ConflictSet& CS, const StepFinder<OxProblemType>& SF)
{
//TRACE("IMPLICIT: Trying to trace step: %s\n",S("Input").getText().c_str());
  // Can a step from the conflict set be inserted to make an untraced step correct?

OxProblemStep::const_ptr pImplicitS = FindImplicitStep(S,Sol,CS,SF);
  if (pImplicitS) {
//TRACE("  Step is rationalized by assuming implicit step %s\n", pImplicitS->statement().c_str());

// Create implicit step node
    XML::Node IS = Trace.addChild("ImplicitStep");
    // Use Index value of step enabled by implicit step to make the association between them
    IS.setAttribute("Index",S.getAttribute("Index"));
    IS.addChild("OxProblemStep").setText(InputForm(*pImplicitS));
    AddStepProductionsNode(IS,pImplicitS);
    AddTracedStepAccepted(Trace,IS,SF);

// Trace and accept current step
    ProblemSolution<OxProblemType> SolI = Sol;
    SolI.add(pImplicitS);
    ConflictSet CSI = SF(SolI.state());
    bool TP = TraceProductionStep(S,Sol.problem(),CSI);
    ASSERT(TP);
    AddTracedStepAccepted(Trace,S,SF);

return true;
  }
  return false;
}

// ************ Secondary function ************

OxProblemStep::const_ptr FindImplicitStep(const XML::Node& S,
                  const ProblemSolution<OxProblemType>& Sol,
                  const ConflictSet& CS,
                  const StepFinder<OxProblemType>& SF)
{
  OxProblemStep::const_ptr pImplicitS;
```

FIG. 11

```
// Append the steps in the conflict set to the current partial solution one at a time
// and see if the given step becomes justified as a result
StepMatchProductionPred SMPP(S,Sol.problem());
SMPP.setStrict(false);
for (int i = 0; i < CS.size(); ++i) {
  ProblemSolution<OxProblemType> Soll = Sol;
  Soll.add(CS[i]);
  ConflictSet CSI = SF(Soll.state());
  ConflictSet::const_iterator it = find_if(CSI.begin(), CSI.end(), SMPP);
  if (it != CSI.end()) {
    pImplicitS = CS[i];
    break;
  }
} return pImplicitS;
}
```

FIG. 12

ARTIFICIAL INTELLIGENCE SOFTWARE FOR GRADING OF STUDENT PROBLEM-SOLVING WORK

SPECIFIC REFERENCE

This application claims benefit of provisional application Ser. No. 61/052,669 filed May 13, 2008.

GOVERNMENT RIGHTS

This invention was made with the United States Government support under SBIR Grant No. DMI-0232223 from the National Science Foundation. The United States Government has certain rights in this invention.

BACKGROUND

1. Field of the Invention

The present invention relates generally to artificial intelligence software. In particular, taught herein is an automated grading program for student assessment which grades homework and test problems in which students show their own work in detail, statistically performing the grading job as well as or better than a human teacher in realistic situations. The program was validated by directly comparing its grading against that of actual teachers on a database of authentic student work. The artificial intelligence (AI) program achieved excellent inter-rater agreement with the teachers while eliminating inconsistencies in grading due to human error.

2. Description of the Related Art

The importance of sophisticated high-quality tools for assessment, for example in chemistry, is on a par with interactive tutoring.

The majority of current assessment tools are based on multiple-choice (MC) tests or similar, very basic techniques. For example, in older systems described in U.S. Pub. 2003/0180703 a system and method is provided for educational assessment of at least one student wherein, using a computer network, the method includes providing a test for subject matter and dynamically generating an answer sheet for the test. A completed answer sheet is scanned with an image scanner. Answers are graded on the scanned image of the answer sheet and results are automatically stored from the grading of the answer sheet in a central repository at the central server for at least one student. In US 2005/0255439 shown is a method and system for generating and processing an assessment examination answer sheet. The answer sheet is formatted by question, column or section using a layout tool and includes calibration marks, and examinee and examination identifiers. The format is stored in a computer-readable form, such as an XML file. Upon completion, a scanned image of the answer sheet is produced using a conventional scanner.

While this is sufficient for simple purposes such as easy grading, MC is a relatively blunt instrument for diagnosis and assessment and is inadequate as a foundation for developing the more sophisticated individualized assessment capabilities needed by teachers. Grading by a human teacher when students show all their work in detail provides more sophisticated and meaningful assessments of learning than MC tests.

The problem is that in practice teachers seldom, if ever, have time to perform such in-depth analysis for each and every student. At the same time, recent trends are toward increasing requirements for teachers to compile, evaluate and provide more detailed reports of student achievement, increasing the demand on the already-overburdened teacher's time. The potential benefits of robust, dependable AI-based software assessment tools are considerable for helping teachers increase their effectiveness and achieve the greatest return on their time and resources.

Intelligent tutoring systems (ITSs) are currently being developed. A major advantage of these systems and also relevant to this work is that they can create a worked-out solution with detailed explanations for any problem entered by the student or teacher from any type of source, whether it be a textbook, a software program (including the ITS itself), or any randomly entered external problem. See for example U.S. Pat. Nos. 6,540,520 and 7,351,064. Unlike a conventional tutorial, this is done dynamically, without the problem being stored ahead of time. In controlled testing, the above ITS was shown to improve student performance significantly, which was encouraging for the prospect of building assessment technology on the same foundation.

A major drawback to "step-oriented" computer assessment and a major challenge solved by the present invention is the reliable, consistent assignment of partial credit for student attempts at solving problems having a large number and variety of non-equivalent multi-step solution paths. This is often the case, for example, in scientific and mathematical problem domains. When attempting to solve such problems, a student may follow any one of the possible solution paths, making (and possibly then also propagating) any number of errors along the way, or the student's attempted solution path may not correspond to any legitimate path. The solution attempt may also be complete or incomplete. Furthermore, the method must work with problems that are input to the system dynamically by an external party, such as from an instructor's assignment or an electronic homework system, instead of from a supplied rubric for a fixed problem or set of preprogrammed problems. This makes consistent and fair assignment of partial credit by the AI system across all student attempts to solve a problem very difficult.

SUMMARY OF THE INVENTION

It is the objective of the instant AI tutor feature to implement automated assessment technology which includes: the ability for the assessment problems to be specified to the system by the user (e.g. the teacher), rather than limiting selection to a bank of pre-stored items; deriving grades by analyzing the student's own work in its entirety, which he or she inputs in detail rather than picking a MC answer, thus automatically grading answers for which the teacher instructs the student to "show your work"; the ability to use a robust grading rubric based on new conceptually oriented AI methods embodied in the tutor, including ability to analyze unanticipated student errors; the ability to embed assessment capabilities in existing online learning systems, and provide results in a format that can be readily interfaced with online gradebooks and other measurement and reporting capabilities of learning management systems.

Accordingly, the instant invention comprehends a method using a computer for grading student work when the student's own steps are shown in detail, comprising the steps of creating a reference trace representing a complete solution to the problem; creating a student trace of the student's work, further comprising the steps of explicitly searching for specific rationale for appending a step to the trace; deeming the step a correct production provided the system was able to reproduce the step and marking the step as traced; provisionally accepting the step as part of the best solution, subject to revocation if a better-quality step is later found by a step conflict check;

implicitly tracing the student's work to discover implicitly taken mental steps provided the explicit tracing has failed to justify a step; appending any remaining untraced steps to the trace and excluding them from the best solution path; computing a value of the steps in the student's solution; comparing the student's value to the total value of the steps in the reference trace; and, as a result producing and displaying at least a partial score for the student for the problem.

BRIEF DESCRIPTION OF THE DRAWINGS

FIGS. 5-7 show source code representing the main function that corresponds to FIG. 1 (student trace) and also contains the logic for FIG. 2 (explicit step tracing).

FIGS. 8-10 show source code representing the main and secondary function that corresponds to FIG. 3 (resolving a step conflict).

FIGS. 11-12 show source code representing the main and secondary function that corresponds to FIG. 4 (implicit tracing).

Figure 1:
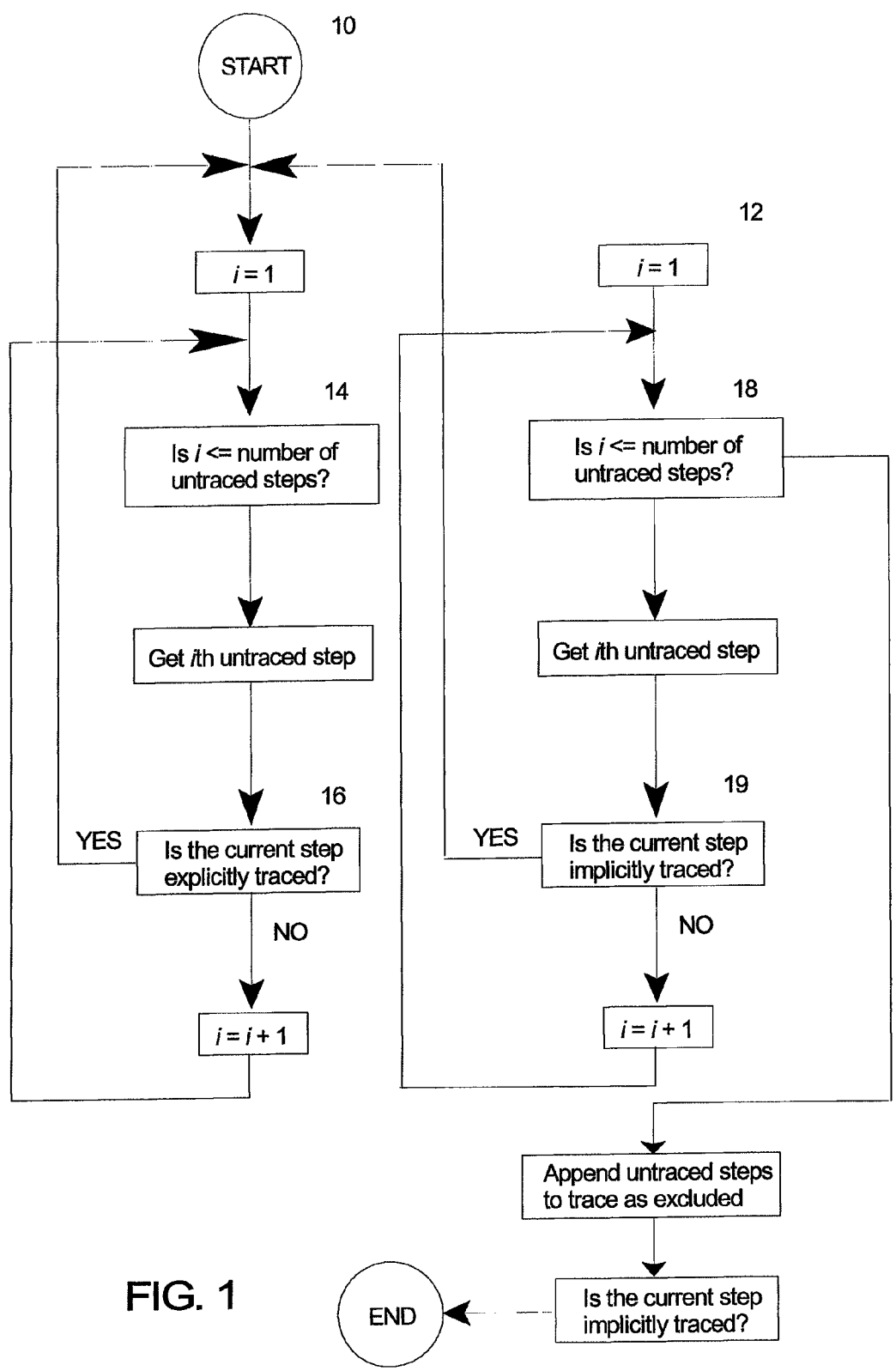
FIG. 1 is a flow diagram representing the construction of a student work trace.

The flow charts and/or sections thereof represent a method with logic or program flow that can be executed by a specialized device or a computer and/or implemented on computer readable media or the like (residing on a drive or device after download) tangibly embodying the program of instructions. The executions are typically performed on a computer or specialized device as part of a global communications network such as the Internet. For example, a computer typically has a web browser installed within the CPU for allowing the viewing of information retrieved via a network on the display device. A network may also be construed as a local, ethernet connection or a global digital/broadband or wireless network or the like. The specialized device may include any device having circuitry or be a hand-held device, including but not limited to a cellular phone or personal digital assistant (PDA). Accordingly, multiple modes of implementation are possible and "system" as defined herein covers these multiple modes.

DETAILED DESCRIPTION OF THE PREFERRED EMBODIMENT

The method presented is domain-independent and can be implemented in any production rule-based system to create an elegant general solution to the partial credit problem. The method works with problems that are input to the system from within the system or dynamically by an external party, such as from an instructor's assignment or an electronic homework systems instead of from a supplied rubric for a fixed problem or set of problems. Accordingly, "problem" as defined herein means a question or problem taken from either the program itself or from an external source other than the program, which may encompass a teacher, a student, or any other individual inputting a problem taken from a textbook, a software program, an assignment or any third party source, even if not initially stored or preprogrammed by the system.

The concept of the grading algorithm is to use the AI system's capabilities to create a solution trace of the student's work and then construct a standard against which the student's solution can be compared for the purpose of assigning partial credit. The value of the correct steps in the student's solution is computed using an appropriate scoring function (to be defined) and compared to the total value of the steps in a complete solution to the problem called a "reference trace."

The reference trace is the particular correct solution that most closely corresponds to the student's solution. That makes it appropriate for direct comparison in judging how much the student accomplished relative to a complete solution. For domains where the possible solution paths vary considerably, this could not be accomplished by using a single fixed solution path as a reference. The current method provides a general way of implementing scoring by assessing the value of what the student accomplished relative to an appropriate complete and correct solution.

The first issue is to generate a trace of a student problem attempt suitable for grading analysis. The concepts involved in construction of the student trace are illustrated in typical application as follows. The expert system is used to trace the student's solution up until the first point of departure of the student's solution from any correct partial solution path generated by the system. At this point of departure, the next student step is either an error or a premature step that follows from mental steps that were not recorded by the student. To determine the latter, the individual steps in the current set of all productions generated by the expert system (the conflict set) are used as trial steps appended to the student's partial solution trace. If appending any such conflict set step renders the student step as a "correct" step at the next level as judged by the expert system, then the step from the conflict set "bridges the gap" to the student's next step and is included in the solution trace as an assumed implicit mental step, and the tracing of correct steps is resumed.

When this process is unsuccessful, the step is an error. The step is labeled as an error and included in the solution trace for the purpose of allowing it to be propagated by the expert system Once an erroneous step has been included in the trace, the steps generated in the expert system's conflict set may no longer be absolutely correct since they are productions on an erroneous problem state. However, for the purpose of assigning partial credit, as discussed below, it is necessary to determine whether subsequent incorrect student steps are only a result of prior errors, to factor out these effects in order to avoid double-penalizing the student. This will be manifested by appearance of the subsequent erroneous step in the conflict set, since it can be directly generated by the system's production rules operating on the student's partial solution containing the prior incorrect steps. When subsequent erroneous steps cannot be reproduced in this manner, this indicates that additional new errors are present in the student's work.

This describes representative applications that illustrate the concept of the student trace, but is not a complete exposition of the challenges that must be handled by the grading algorithm First, the question "What is the student's solution?" is not nearly as straightforwardly answered as it initially appears. There are a number of issues involved. The purpose of the trace is to create a logical ordering of the student steps and to determine which steps taken belong to the student's "best" attempt at a solution path, i.e. the "best solution path" closest to the work of the student. These must be done explicitly at the outset.

Why is determination of a step ordering necessary—isn't it simply the order in which the steps are listed by the student? No. Students don't always record their steps in the same order of logical progression that they intend them in the solution, or even in the same order that they were taken mentally. A step written first does not amount to the student claiming it was determined first. An instructor must likewise take this into account when grading by hand.

Why is explicit identification of a "best" student solution path necessary? Not all student steps written are (or are even always intended to be) part of the student's "best" attempt to solve the problem, upon which the score is to be based. Sometimes redundant, conflicting or irrelevant steps are left in the student's work, whether the student is working on paper or in a computerized system. Steps may also be taken mentally and not recorded at all. Subsequent correct steps shown by the student that would depend on the mental step make it unlikely that these were not actually taken. Both the human instructor and the computerized system must be able to recognize and deal with these situations appropriately.

With reference then to FIGS. 1-12, FIG. 1 shows in flow chart step form the algorithm (detailed in source code form by FIGS. 5-7) for constructing a trace of the student's work. A list of the student's steps is initially set up in the order shown by the student. It is attempted to trace steps first explicitly 10, by searching for a specific rationale for appending a step to the solution trace sequence, and then implicitly 12, by inserting a step from the current conflict set in order to create a justification for the step. Implicit tracing 12, which discovers implicitly taken mental steps, is attempted only when explicit tracing 10 has failed to justify any of the currently untraced steps.

EXAMPLE 1

Is i<=number of untraced steps? 14;
Is the current step explicitly traced? 16, then to 12 and FIG. 2;
Is i<=number of untraced steps? 18
Is the current step implicitly traced? 19, then to FIG. 4.

Figure 2:
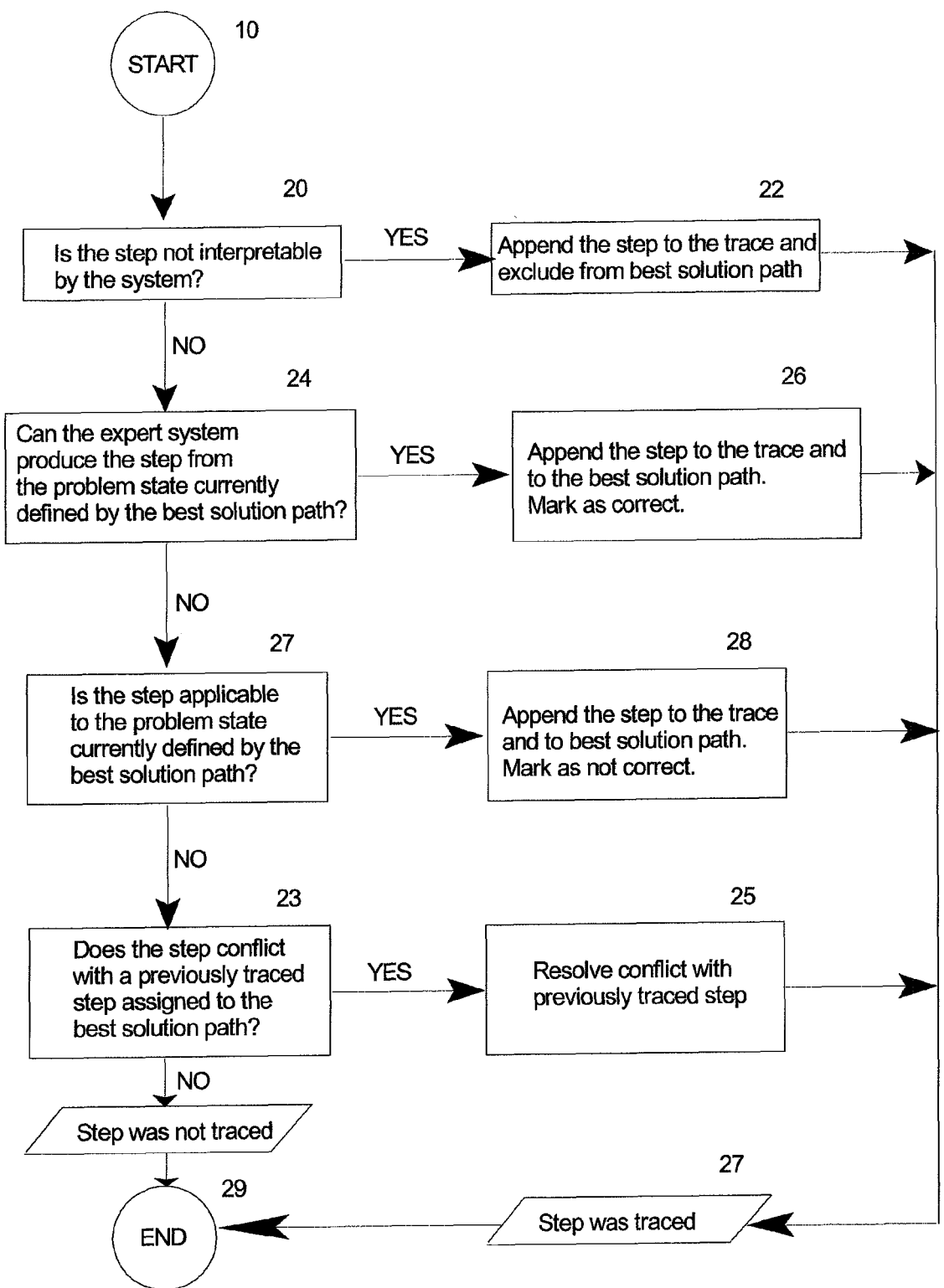
FIG. 2 is a flow diagram representing the explicit step tracing.

In explicit tracing 10, shown in flow chart step form in FIG. 2 (detailed in source code form by FIGS. 5-7), each untraced step in the list is subjected to a series of assessments of increasing complexity, to find the simplest and clearest rationalization for the step. First, if the student's step could not be interpreted by the system 20, it cannot be considered part of the best solution path; hence the step is marked as traced and removed from further consideration 22. If the step is interpretable, it is checked against the conflict set evaluated at the problem state defined by the steps included in the best solution path so far 24. If present, this means the system was able to reproduce the student's step at the current state and the student's step is deemed a correct production 26, just as in a conventional ITS. It is marked as traced 27 and appended to a list of steps representing the student's best solution path. Note that correspondence of a step to a correct production does not automatically mean the step is correct (as it would, for example, in an interventionist ITS); it only means the step can be produced by the production system given the current state defined by the steps included in the best solution path so far. The step will be correct only if all preceding steps upon which the current step depends are also correct; otherwise the step is the result of propagating a prior error. A significant advantage of the method in assigning partial credit, as will be seen, is the ability to distinguish these two situations, a recognized limitation of the majority of current electronic homework systems.

EXAMPLE 2

Is the step not interpretable by the system? 20
Append the step to the trace and exclude it from the best solution path 22 (go to 27).

Can the expert system produce the step from the problem state currently defined by the best solution path? 24
Append the step to the trace and to the best solution path and mark the step as a correct production 26 (go to 27).
Is the step applicable to the problem state currently defined by the best solution path? 27a
Append the step to the trace and to the best solution path. Mark the step as not a correct production 28 (go to 27).
Does the step conflict with a previously traced step assigned to the best solution path? 23
Resolve conflict with previously traced step 25 (go to 27).

Figure 3:
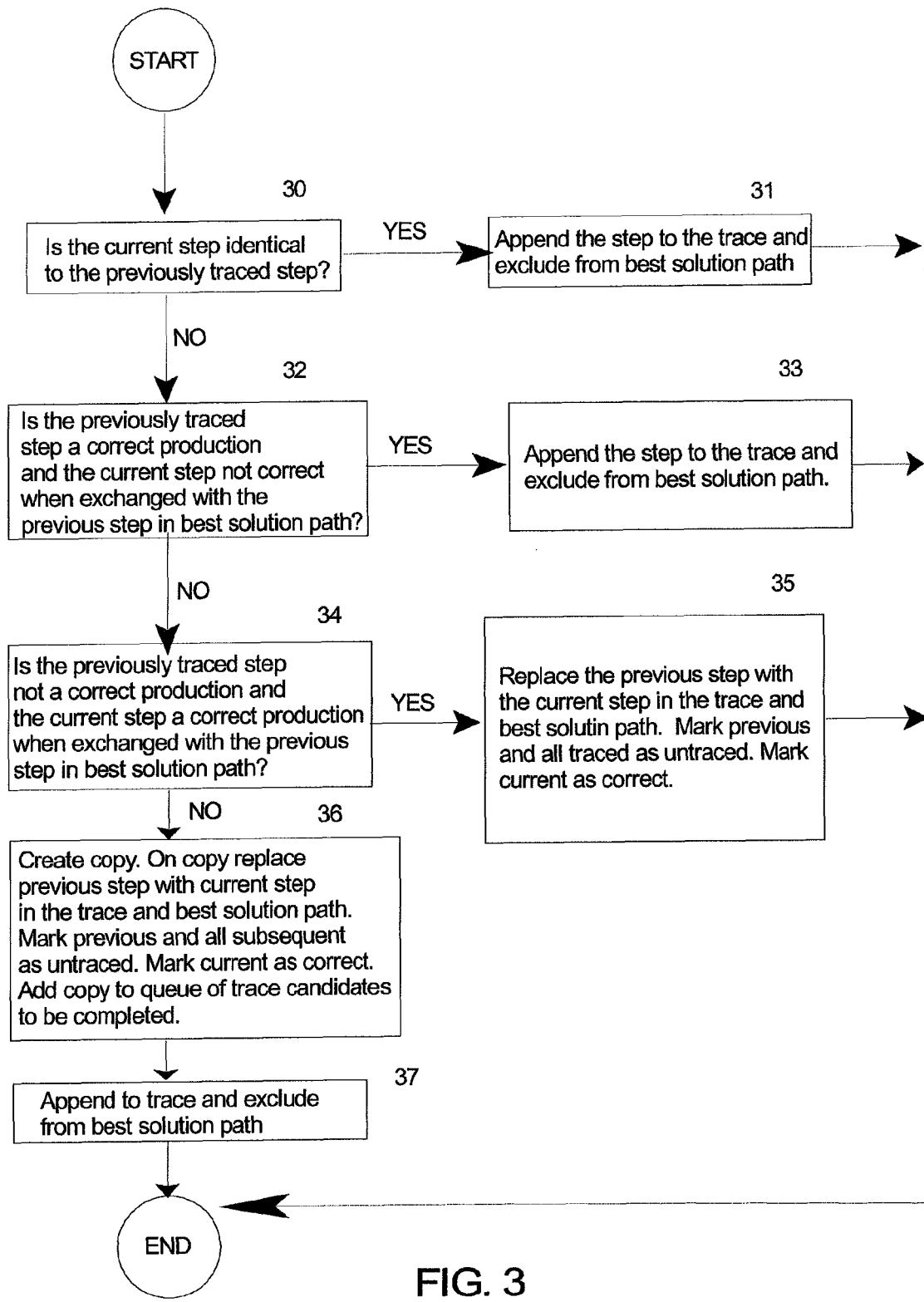
FIG. 3 is a flow diagram representing the resolution of a step conflict.

However, with reference to FIGS. 3, 8-10, steps that do not currently correspond to correct productions cannot simply be labeled as incorrect right away (as alluded above). The next case is when the student's step is not a correct production, but still meets the weaker condition of applying to the problem state defined by the current best solution path, i.e. the step could be taken at this point without being premature, but it is not correct. The step is provisionally accepted as part of the best solution at this point, subject to revocation if a better-quality step is later found to fit in its place. This is addressed in the resolution of step conflicts, i.e. when two student steps are applicable at the same point in the best solution path, which is the remaining consideration in explicit tracing. FIG. 3 illustrates the step conflict resolution mechanism.

EXAMPLE 3

Is the current step identical to the previously traced step? 30
Append the current step to the trace and exclude it from the best solution path 31 (end).
Is the previously traced step a correct production and the current step not a correct production when exchanged with the previous step in the best solution path? 32
Append the current step to the trace and exclude it from the best solution path 33 (end).
Is the previously traced step not a correct production and the current step a correct production when exchanged with the previous step in the best solution path? 34
Replace the previous step with the current step in the trace and best solution path. Mark the previous step and all subsequently traced steps as untraced. Mark the current step as a correct production 35 (end).
Create a copy of the current trace. On the copy replace the previous step with the current step in the trace and best solution path. Mark the previous step and all subsequently traced steps as untraced. Mark the current step as a correct production. Add the copy to the queue of trace candidates to be completed 36.
Append the current step to the current trace and exclude it from the best solution path 37.

The rationale behind step conflict resolution is that when two steps are applicable at the same point, if one step is unambiguously better than the other, e.g. one step is a correct production and the other is not, then the better step is accepted on the best solution path, even replacing a previously accepted step if necessary. The most interesting case is when both steps are of equivalent quality with respect to the current state, in which case a decision between them cannot immediately be made. The method of handling this contingency is simply to accept both steps on a trial basis, creating two divergent solution trace candidates (as seen in FIG. 3). This raises the issue of assigning a score when the student trace is not unique, but a simple and appropriate means of deciding between realistic competing trace candidates is to take the trace yielding the best ultimate score. This provides an easy way of distinguishing which of the two conflicting steps (if either) is ultimately better without requiring that decision to be made before all relevant ramifications of accepting or rejecting a given step are yet known.

It should be noted that the possibility of multiple traces for a given set of student steps is addressed for completeness and robustness of the automated grading algorithm, but in practice this situation rarely arises. Though the frequency of occurrence is likely dependent upon the domain of application, in practice when using realistic test cases with the preferred embodiment the student trace obtained is almost always unique.

If untraced steps remain after the explicit tracing algorithm has been exhaustively executed, implicit tracing is conducted in an attempt to rationalize steps that do not directly follow from the preceding work shown by the student (at the granularity of student work representation). The key factor in analyzing premature steps is to determine whether the student has in fact carried out an unwritten mental step that led to the premature step, or whether the step is simply an error. The ability to distinguish these cases is a significant advantage of the AI grading algorithm. If this is not taken into account, a grading algorithm would in many cases simply count steps as wrong that actually correspond to correct reasoning by the student, even if all details were not shown, and this is insufficient for realistic applications.

Figure 4:
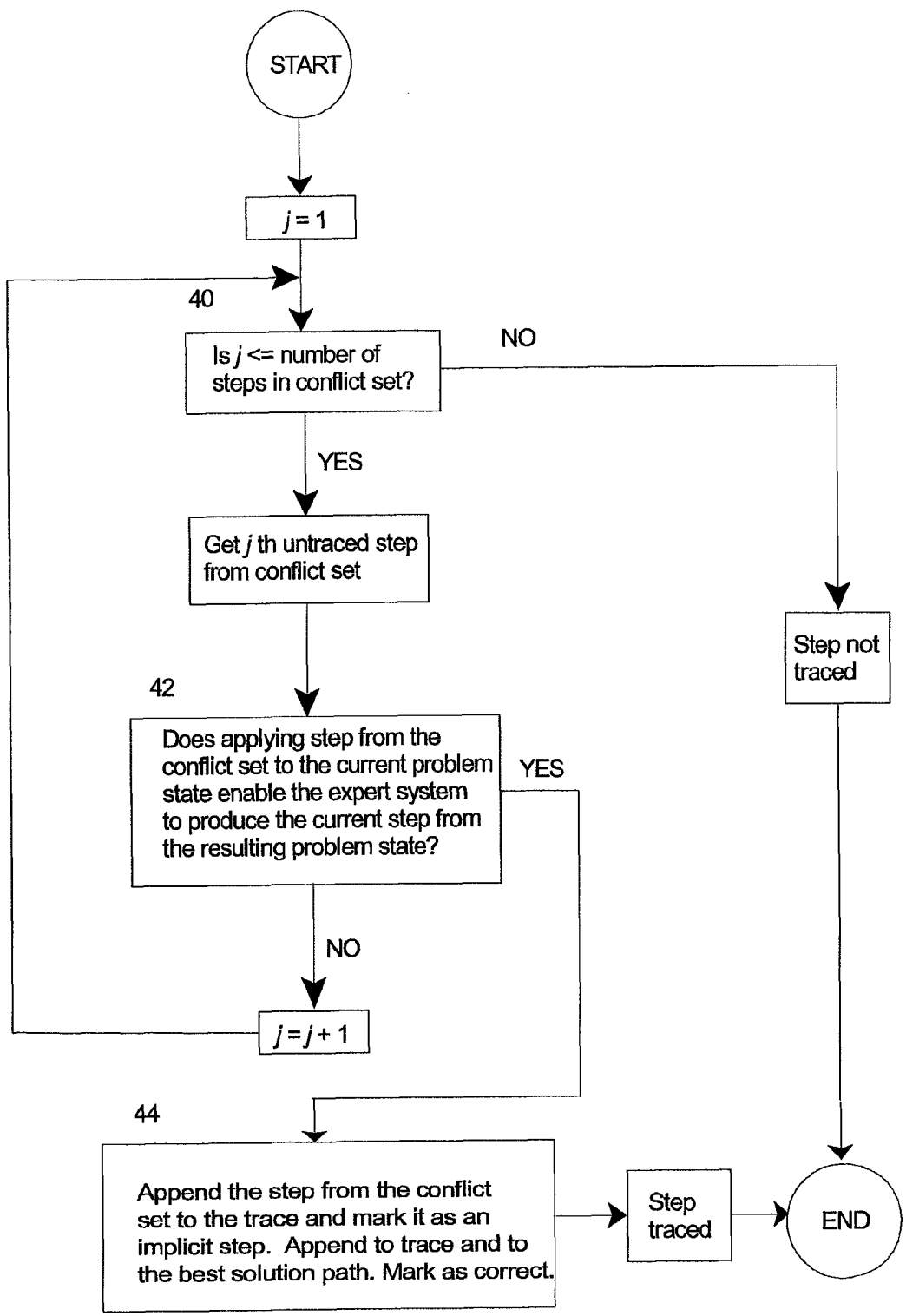
FIG. 4 is a flow diagram representing the implicit step tracing.

As seen in FIGS. 4, 11-12, implicit tracing consists of checking whether inserting a step from the current conflict set (conflict step) before the untraced step would render that step a correct production. If so, then the step inserted from the conflict set is considered an unwritten mental step and the student's step is deemed justified. A key property is that insertion of the implicit step renders the student's step explicitly traceable with respect to it. As seen in FIG. 1, if an implicit step is found, explicit tracing can begin again for any remaining steps.

EXAMPLE 4

Is j<=number of steps in the conflict set? 40

Does applying jth step from the conflict set (conflict step) to the current problem state enable the expert system to produce the current step from the resulting problem state? 42

Append the step from the conflict set to the trace and mark it as an implicit step. Append the current step to the trace and to the best solution path. Mark the current step as a correct production 44.

Note that there is no absolute requirement that a single implicit step be inserted; if a single implicit step fails, a chain of multiple implicit steps could be tried, but the reliability of the resulting diagnosis would likely be decreased significantly. This is also the rationale for only checking whether the untraced step is rendered a correct production by insertion of an implicit step, rather than the broader range of conditions checked in explicit tracing. However, if desired, multiple implicit step tracing is easily accomplished by the present method by simply inserting one, two, etc. steps successively.

Finally, once all possible tracing has been carried out, the remaining untraced steps, if any, are appended to the trace and, since the system was not able to rationalize them, excluded from the best solution path.

The other required component for score determination is a reference trace against which the student trace is compared. For a given student trace, the reference trace is easily generated by finding the first departure from correctness in the student's best solution path sequence, and then using the expert system to complete a correct solution from this point. In this way, the goal of finding a correct reference solution that most closely corresponds to the student's solution is achieved, which addresses the issue of judging student solutions across a diverse spectrum of nonequivalent solution paths. It is seen that in the special case of the student achieving a correct solution, the reference trace is identical to the student's best solution path.

Once a trace of the student's work is obtained, a score can be assigned. At this point, the following are known: the best ordering of the student's steps, any implicitly taken mental steps, the steps comprising the best attempt at a solution, and the steps that are extraneous to the best solution path Significant advantages of the method are that the tracing algorithm a) is entirely domain-independent and b) does not dictate the scoring method. The scoring strategy is applied after the trace is obtained. This gives flexibility for customization of scoring algorithms for different domains as appropriate, while the tracing algorithm itself remains unchanged. Herein will be described a specific scoring algorithm used for the preferred embodiment (a problem domain in chemistry), but the automated grading method is in no way limited to this.

Before delving into issues specific to development of a scoring function for the preferred embodiment application, some generally important characteristics of scoring are given. First, the focus here is on assigning a score to a single student trace. It was already seen that the potential for the multiple student trace candidates exists. Again, when this occurs one simple resolution is to choose the trace giving the highest (relative) score. When the system must choose among nonequivalent scenarios with insufficient basis available for substantive distinction, it is typically a preference to make the choice to give the student the maximum benefit of a doubt. Henceforth, therefore attention is restricted to a single student trace.

A more important general issue is assigning partial credit in solutions with propagated errors. Judicious assignment of partial credit often depends on whether a student's incorrect step is the result of (correctly) propagating an earlier incorrect step, or if it is an error in its own right. In the former case partial credit may be deemed appropriate to reward a correctly taken step (albeit on an incorrect state) and to avoid penalizing the student too harshly for the original mistake that was propagated; simply awarding zero credit for all literally incorrect steps (as electronic homework systems typically do) is often insufficient. As mentioned earlier, ability to distinguish these two cases overcomes a significant limitation of current electronic homework systems.

The specific knowledge made available through the student trace readily provides a means of resolving this issue. In an interventionist ITS only correct steps are generated by the system since only correct partial solutions are used as a starting point for step generation, and in such a system the conventional definition of a correct step is a step that appears in the conflict set generated on the current solution path. However, when grading, the system must also analyze incorrect solution paths, and thus at some stages the conflict set can contain incorrect steps that result from building on incorrect prior work. To distinguish whether an erroneous step is simply the result of propagating a prior mistake or is a new, independent error, the notion of a correct step is restricted to require not only presence in the conflict set but also that all prior steps upon which it depends are also correct.

This approach requires explicit determination of step dependencies, since a given step does not automatically depend on all previously taken steps. Operationally, step dependencies are discerned as follows: step B is dependent on step A if removing step A from the trace renders step B no longer applicable to the solution as determined by the tracing algorithm. Once these are determined, a correct production that is not also a correct step is the result of propagation of a previous error. If partial credit is to be considered for correct productions contaminated by prior errors, a powerful property of the student tracing approach is that this important ability is afforded naturally Scoring functions can then be designed to take this into account if desired; this was done in the preferred embodiment example.

Described now is the development of a scoring function for the domain of the preferred embodiment. We have determined the feasibility of this concept by developing an automated grading program for student work on chemistry problem homework and tests. The topic of assigning oxidation numbers, taught in all high school chemistry classes, was the content focus of the Phase I study. The oxidation number is the charge an atom in a chemical compound would have if all bonds were assumed to be ionic. This is a good choice for an initial study since it is recognized as a nontrivial topic that typically gives students difficulty. Problems involve a variety of concepts including gain and loss of electrons, knowledge of the periodic table and conservation of charge. Solutions are multi-step with the assigned values being interrelated, entailing a sufficient degree of variety and complexity that the experience will prove valuable for developing assessment engines for other chemistry topics.

It is important to keep the distinction between domain-independent and domain-specific issues clear since a major advantage of the method is that scoring is highly customizable to the domain of application as well as to the specific grading tastes of the user. Therefore, the following design decisions for the scoring function, though realistic and likely appropriate for many domains, are made for illustration of the preferred embodiment. Important scoring function decisions for the preferred embodiment example include:

Credit is given only for steps on the traced best solution path. Steps not included in the best solution path are not considered.

The trace score is obtained as the sum of individual step-wise contributions. This does not mean the step scores are independent, since consideration of step dependencies and error propagation can make a step's score contribution dependent on steps preceding it. Nonetheless, this reduces trace score determination to development of a scoring function for an individual step (taken in the context of the best solution path).

No credit is given for implicitly taken steps since these were not recorded by the student. However, since the dependencies of the student's steps on implicit steps are determined, this leaves open the option of assigning partial credit to steps that follow from implicit steps.

Again, these requirements are not mandatory for use of the method in general and could be done differently if desired. For example, if a scoring penalty were desired for steps extraneous to the best solution path, this could easily be included.

A stepwise scoring function for oxidation number assignment meeting the above desired criteria was developed with the following additional requirements:

The step score consists of two contributions: a component for a correct production and a component for correctly building on prior steps.

The first score component is defined as one point per correct step. Though this value could be varied based on step type, this was not found necessary to produce accurate grading trends in the current application.

The second score component is defined as the sum of the production score components for all correct prior student steps in the solution trace upon which the current step is dependent, multiplied by a scale factor.

When an incorrect step is a correct production that propagates errors in prior steps, a scale factor is applied to the step's total score as determined above, allowing for partial credit to be awarded. (Setting the scale factor to zero gives no partial credit.)

This defines a model with two parameters: one controlling the relative weight of correct productions to building on correct prior work, and one controlling the amount of partial credit to award for incorrect steps resulting from propagation of prior errors. In the current embodiment, it was empirically determined that setting the value of both parameters to ½ produced results of appropriate quality and reliability.

The student trace score thus determined represents a "raw" score. This score is not adequate to use as a final grade because of potential variability in solution paths. For example, a given problem may have one solution path with only three steps and a different solution path with five steps. One student may correctly find the first path while a second student may take three out of the five correct steps on the second path. Both students have taken exactly three correct steps, but the first student deserves full credit while the second student should receive only partial credit.

A reference trace raw score is then obtained by the same scoring method used for the student trace. The key difference is that all steps in the reference trace are counted (since they are all correct), including scores of any implicit steps from the student trace incorporated in the reference trace. Since the reference trace is the correct solution that most closely corresponds to the student's solution, the ratio of the student's raw score to the raw score of the reference trace gives a reasonable and consistent score for the student's solution that includes partial credit, and solves the problem of normalization across different solution paths with varying numbers of steps and step complexities.

For empirical validation of the preferred embodiment, students in first-semester general chemistry at the University of Kentucky participated in a study of the effectiveness of the oxidation number intelligent tutoring system. As part of this study, students took tests on assigning oxidation numbers, consisting of five problems of varying difficulty, in which they were instructed to show as much work as possible to obtain partial credit. Fifty student papers (for a total of 250 problem attempts) from this study were randomly selected and used as a database for testing and validation of the AI grading algorithm as discussed below. The oxidation number test is shown in FIG. 2.

To compare the performance of the AI program with actual teacher grading, identical copies of the student papers were given to four different high school chemistry teachers to grade.

Teacher 1: Four years of classroom experience in the Kentucky public school system.

Teacher 2: Over twenty-five years of classroom experience in the Kentucky public school system.

Teacher 3: Over twenty-five years of classroom experience in the Florida public school system.

Teacher 4: Six years of classroom experience in the Kentucky public school system.

This gave direct comparison on the same dataset of the AI grading program with a range of representative teacher grading practices. Scores assigned by all four teachers were compared with the AI grader's scores and with each other. Before analyzing the results, we list some important points about the nature and purpose of the comparison with human graders.

A main goal of the comparison is to conduct initial validation of the AI grading program in a realistic situation. This is intended to confirm that the AI system is performing robustly on a genuine application in advance of actual classroom trials.

Though it is well-known that the grading process is susceptible to human error, it is useful to document the extent of human error in the dataset examined. This is of interest because the AI results are free of such error, which is one of the intended benefits to teachers using the system.

It is not an objective to compare teachers with the AI grader on identical grading rubrics. The teachers were deliberately instructed to grade the papers just as they would in their own classes. This is a more pertinent comparison, since in practice teachers most commonly devise their own individual grading schemes. More importantly, though, the ability of the AI program to generate and use a more sophisticated metric than is practical for human graders to apply in realistic situations is another of the advantages deliberately intended to benefit teachers using the AI system.

Table 1 shows the mean scores assigned by the four teachers and the AI grader for the oxidation number test as a whole and on a problem-by-problem basis. All scores reported in this work have been normalized to a maximum of 100 points for comparison purposes.

TABLE 1

Mean Oxidation Number Test Scores

|  | Teacher 1 | Teacher 2 | Teacher 3 | Teacher 4 | AI Grader |
|---|---|---|---|---|---|
| Entire Test | 57.2 | 50.8 | 62.9 | 53.2 | 59.4 |
| Problem 1 | 50.3 | 44.7 | 53.8 | 43.0 | 49.6 |
| Problem 2 | 76.8 | 72.0 | 85.0 | 69.2 | 82.8 |
| Problem 3 | 64.0 | 53.3 | 64.3 | 58.7 | 64.4 |
| Problem 4 | 35.2 | 32.0 | 47.7 | 43.3 | 45.5 |
| Problem 5 | 59.5 | 52.0 | 63.5 | 51.8 | 54.4 |

While mean scores alone do not ascertain the quality of the grades, many interesting initial observations are readily made. First, the mean AI scores are entirely in line with those assigned by the four teachers; no significant differences are observed. There is no indication of any systematic trends of under-awarding or over-awarding of credit with respect to the grading of the four teachers in the study.

The AI program tends to be nearer the upper end of scores awarded, but lies firmly within the group of graders. The AI grader had the second highest overall mean score in the group, was the highest of the five on Problem 3, second highest on Problems 2 and 4, and ranked third (i.e. in the middle of the group) on Problems 1 and 5.

The range of mean scores is typically around 12 points, which is fairly close given that the teachers used their own rubrics (as did of course the AI grader). Some teachers are tougher graders than others, but the more important question is whether they grade consistently with each other.

TABLE 2

Inter-Rater Correlation Coefficients for Oxidation Number Test Scores

|  | Teacher 1 | Teacher 2 | Teacher 3 | Teacher 4 | AI Grader |
|---|---|---|---|---|---|
| Entire Test |  |  |  |  |  |
| Teacher 1 | — | 0.853 | 0.864 | 0.473 | 0.864 |
| Teacher 2 |  | — | 0.836 | 0.432 | 0.850 |
| Teacher 3 |  |  | — | 0.549 | 0.916 |
| Teacher 4 |  |  |  | — | 0.469 |
| AI Grader |  |  |  |  | — |
| Problem 1 |  |  |  |  |  |
| Teacher 1 | — | 0.889 | 0.896 | 0.787 | 0.901 |
| Teacher 2 |  | — | 0.852 | 0.771 | 0.841 |
| Teacher 3 |  |  | — | 0.768 | 0.913 |
| Teacher 4 |  |  |  | — | 0.791 |
| AI Grader |  |  |  |  | — |
| Problem 2 |  |  |  |  |  |
| Teacher 1 | — | 0.848 | 0.821 | 0.657 | 0.855 |
| Teacher 2 |  | — | 0.822 | 0.527 | 0.852 |
| Teacher 3 |  |  | — | 0.638 | 0.916 |
| Teacher 4 |  |  |  | — | 0.640 |
| AI Grader |  |  |  |  | — |
| Problem 3 |  |  |  |  |  |
| Teacher 1 | — | 0.811 | 0.908 | 0.687 | 0.881 |
| Teacher 2 |  | — | 0.793 | 0.579 | 0.809 |
| Teacher 3 |  |  | — | 0.696 | 0.948 |
| Teacher 4 |  |  |  | — | 0.692 |
| AI Grader |  |  |  |  | — |
| Problem 4 |  |  |  |  |  |
| Teacher 1 | — | 0.843 | 0.848 | −0.588 | 0.866 |
| Teacher 2 |  | — | 0.847 | −0.598 | 0.874 |
| Teacher 3 |  |  | — | −0.392 | 0.831 |
| Teacher 4 |  |  |  | — | −0.610 |
| AI Grader |  |  |  |  | — |
| Problem 5 |  |  |  |  |  |
| Teacher 1 | — | 0.793 | 0.786 | 0.650 | 0.770 |
| Teacher 2 |  | — | 0.806 | 0.562 | 0.844 |
| Teacher 3 |  |  | — | 0.642 | 0.918 |
| Teacher 4 |  |  |  | — | 0.567 |
| AI Grader |  |  |  |  | — |

The question of inter-rater agreement is one of the most significant issues on the quality of the AI grading program. Pearson's correlation coefficient (r) was calculated for all pairs of graders, for the entire test and for each individual problem. These results are presented in Table 2.

The correlation coefficients clearly establish that the AI grader performs just as well as the teachers on this real-world grading task. On the test as a whole, there is good agreement among Teachers 1-3 and the AI grader, with all correlation coefficients greater than 0.8. Not only does this mean the AI grader correlates strongly with the grading of Teachers 1-3, it shows that these three teachers furthermore agree with each other. The AI program agreed best with Teacher 3 overall who was one of the two experienced career teachers. The overall correlation coefficient with Teacher 3 is greater than 0.9, and is greater than 0.9 for each individual problem except Problem 4, where it is 0.831. Teacher 4 is an outlier, with whom neither Teachers 1-3 nor the AI grader agree closely. The patterns in the correlation coefficients observed for the entire test are observed on the individual problems except for Problem 4, which is an interesting case discussed below. It was furthermore verified by direct examination that the individual AI scores are consistent with the sophistication of the partial solution on all problems.

The bottom line is that the variation between the AI grader and the teachers is no greater than the differences among the teachers themselves, and by this practical measure the AI grader does the job just as well as the teachers. Put another way, if the grader labels were omitted from Tables 1 and 2, it would be impossible to pick out the AI grader from the group.

Individual problem scores often differ among graders, as expected; each grader applies his or her own judgment when grading, and so does the AI program. On this dataset, the quality of the AI algorithm's judgment is on a par with that of the teachers at the least.

While not a dominant factor in this study, human error was observed. The most dramatic example is for Teacher 4 on Problem 4. Here the teacher made an error in working the problem when preparing a grading key. Though this result was not anticipated, it vividly illustrates the potential impact of human error on the grading process. Accordingly, all scores assigned by Teacher 4 on this problem were erroneous. In Table 2, negative correlation coefficients are obtained for Problem 4 between Teacher 4 and all other graders, including the AI grader. Teacher 4 assigned a perfect score to a particular incorrect solution while giving a low score for the actual correct solution. This together with the poor correlations in general suggests quality of grading of Teacher 4 was not at the same level as Teachers 1-3 or the AI grader.

Another indicator of human error is inconsistency in the scores assigned by an individual grader. Consistency is a necessary attribute of any robust and dependable grading scheme. The most visible measure of consistency is patent consistency, which means that students arriving at the same solution should always receive the same score. Table 3 presents one simple investigation of patent consistency on this dataset by compiling the frequencies in which a complete, correct solution was not awarded full credit. These cases are obviously due to human error.

TABLE 3

Instances of Failure to Award Full Credit for Correct Solutions

| | Correct Solutions | Full Credit Not Awarded | | | |
|---|---|---|---|---|---|
| | | Teacher 1 | Teacher 2 | Teacher 3 | Teacher 4 |
| Problem 1 | 3 | 0 | 0 | 0 | 1 |
| Problem 2 | 34 | 1 | 1 | 0 | 13 |
| Problem 3 | 17 | 0 | 2 | 0 | 8 |
| Problem 4 | 6 | 0 | 1 | 1 | 6 |
| Problem 5 | 6 | 0 | 0 | 0 | 3 |
| Total | 66 | 1 | 4 | 1 | 31 |
| Percentage | | 1.5 | 6.1 | 1.5 | 47.0 |

The numbers of times a correct solution was missed by Teachers 1-3 are low, but of course ideally these should all be zero. Teacher 4, on the other hand, failed to award full credit when deserved nearly half the time, which is not acceptable. Even the case of Teacher 2, where students who solved a problem correctly were not given full credit 6.1 percent of the time, raises concern. Recognizing a correct solution is one of the more straightforward grading tasks; achieving scoring consistency on incorrect solutions is even more difficult.

A major advantage of the AI grader over grading by hand is that inconsistencies are totally eliminated. A corresponding column for the AI grader in Table 3 would contain all zeros. Not only is patent consistency straightforwardly achieved, both for correct and incorrect solutions, the AI method goes further by achieving latent consistency in its grading. Latent consistency means that different but equivalent solutions should also receive the same score. The AI is able to recognize latent equivalence by its analysis with relevant principles, as well as ensure that the resulting scores are accurate. Latent consistency is even more difficult than patent consistency to achieve with human graders. As seen, teachers cannot always be expected to maintain consistency and reliability, especially given the typical amount of time available to devote to grading.

We expressly point out that this comparison is not intended as a criticism of the teachers' competency in grading. The grading process is prone to error and inconsistency because of the conditions under which it usually must be done—a large number of papers must be analyzed in a limited time, necessitating assigning scores based on brief inspection, with the task frequently becoming dull and repetitive. It is certain the quality of grading would be better in general if teachers had more time to spend on it, but this is normally just not practical. The task is simply not one that can be done perfectly under the usual circumstances and is much better suited to computer analysis, given that this is now possible. The purpose of this work is to develop software capable of providing teachers with meaningful assistance on a time-consuming, repetitive and error-prone task.

As another illustration of the sophistication of analysis possible with the AI algorithm, we examine a particular solution obtained to Problem 5, $(NH_4)_3PO_4$. The oxidation numbers were assigned to this formula by one student as follows:

$$H=+1, N=-4, O=-2, P=+4$$

Of the four parts to the answer, the values for H and O are correct, while N and P are incorrect. Teachers 1-4 gave this solution 50, 50, 50 and 66.7 points, respectively, but the AI grader gave a score of only 28.6 points. What is the reason for the difference? It turns out in this problem that the values for H and O are relatively straightforward to obtain, with most of the work required to determine N and P. The AI analysis recognized this and correspondingly applied higher weighting to the more difficult results, whereas it is evident Teachers 1-3 merely assigned half credit since two out of the four answers were correct. This is not to say that a score of 50 points is necessarily unreasonable (though the score by Teacher 4 is curious), but it illustrates that the AI grader is able to base its decisions on a greater depth of analysis than is usually realistic for teachers to perform in practical circumstances.

Time and resources are not a limiting factor for the AI grader as with human teachers; the AI algorithm can be as sophisticated as desired, and again, is applied free of the possibility of human error. Furthermore, this enhanced depth of analysis lays a solid foundation for several important features to be developed in Phase II, including generating formative assessment reports for use by the student and the teacher. Research indicates that formative assessment used frequently as feedback to individual students is one of the most effective strategies available to teachers in meeting high standards of student learning.

We claim:

1. A computer-implemented method for grading student work on a problem when the student's own steps are shown in detail, said method comprising the following steps:
utilizing a computer with a production-rule based system to perform:
creating a reference trace representing a best solution path to said problem;
creating a student trace of the student's work, wherein creating the student trace comprises the steps of:
explicitly tracing the student's work, via a processor, by searching for a specific rationale for appending a step to said student trace;
provisionally accepting said step as part of said best solution path, subject to revocation if a better-quality step is later found by a step conflict check;

implicitly tracing the student's work, via the processor, in order to assume implicitly taken unwritten mental steps have been carried out prior to said step provided the explicit tracing has failed to justify said step, wherein said step is either rationalized by an assumption that renders said step justified and appended to said student trace even if not explicitly traced or said step is determined to be an error;

appending any remaining untraced steps to said student trace and excluding them from said best solution path;

scoring said student trace, via the processor, said scoring comprising the steps of:

computing a value of said steps in the student's work to form a student value, wherein said student value is a sum of individual stepwise contributions including a component for a correct production and a component for correctly building on prior steps multiplied by a scale factor, excluding any credit for said implicitly taken unwritten mental steps; and, comparing said student value to a total value of said steps in said reference trace, wherein said reference trace includes scores for any of said implicitly taken unwritten mental steps, as a result producing and displaying on said computer at least a partial score for said student for said problem.

2. The method of claim 1, wherein explicitly tracing further comprises:

marking said step as traced and excluding said step from said best solution path if said step was not interpreted;

marking said step as traced and correct and including said step in said best solution path if said step was interpreted and reproducible; and, marking said step as traced and not correct and including said step in said best solution path if said step is interpreted and not reproducible but is still applicable.

3. The method of claim 2, further comprising marking said step as traced and either incorrect or not correct but still part of said best solution path if said step conflicts with a previous step and the resulting conflict is resolvable by said step conflict check.

4. The method of claim 3, wherein provisionally accepting further comprises:

marking said step as traced and excluding said step from said best solution path if said step is identical to a previously traced step;

marking said step as traced and excluding said step from said best solution path if said step is not correct when exchanged with a previously traced step in said best solution path; and replacing a previous step with said step and marking said previous step and all traced steps as untraced and mark said step as correct if said previous step is not correct and said step is correct when exchanged with said previous step in said best solution path.

5. The method of claim 4, further comprising a step of creating a copy of said trace and on said copy, replacing said previous step with said step in said best solution path and marking only said step as correct and adding said copy to a queue of trace candidates to be later completed.

6. The method of claim 1, wherein implicitly tracing further comprises:

checking whether inserting a conflict step taken from a conflict set generated from said step conflict check would render said conflict step a correct production;

deeming said conflict step as said unwritten mental step which is correct provided said conflict step is the correct production; and, appending said unwritten mental step to said student trace.

7. A non-transitory computer-readable medium for grading student work on a problem when the student's own steps are shown in detail, said non-transitory computer-readable medium causing a computer with a production-rule based system to execute the following steps:

creating a reference trace representing a best solution path to said problem;

creating a student trace of the student's work, wherein creating the student trace comprises the steps of:

explicitly tracing the student's work by searching for a specific rationale for appending a step to said student trace;

provisionally accepting said step as part of said best solution path, subject to revocation if a better-quality step is later found by a step conflict check;

implicitly tracing the student's work in order to assume implicitly taken unwritten mental steps have been carried out prior to said step provided the explicit tracing has failed to justify said step, wherein said step is either rationalized by an assumption that renders said step justified and appended to said student trace even if not explicitly traced or said step is determined to be an error;

appending any remaining untraced steps to said student trace and excluding them from said best solution path;

scoring said student trace, said scoring comprising the steps of:

computing a value of said steps in the student's work to form a student value, wherein said student value is a sum of individual stepwise contributions including a component for a correct production and a component for correctly building on prior steps multiplied by a scale factor, excluding any credit for said implicitly taken unwritten mental steps; and, comparing said student value to a total value of said steps in said reference trace, wherein said reference trace includes scores for any of said implicitly taken unwritten mental steps, as a result producing and displaying on said computer at least a partial score for said student for said problem.

8. The non-transitory computer-readable medium of claim 7, wherein explicitly tracing further comprises:

marking said step as traced and excluding said step from said best solution path if said step was not interpreted;

marking said step as traced and correct and including said step in said best solution path if said step was interpreted and reproducible; and, marking said step as traced and not correct and including said step in said best solution path if said step is interpreted and not reproducible but is still applicable.

9. The non-transitory computer-readable medium of claim 8, further comprising marking said step as traced and either incorrect or not correct but still part of said best solution path if said step conflicts with a previous step and the resulting conflict is resolvable by said step conflict check.

10. The non-transitory computer-readable medium of claim 9, wherein provisionally accepting further comprises:

marking said step as traced and excluding said step from said best solution path if said step is identical to a previously traced step;

marking said step as traced and excluding said step from said best solution path if said step is not correct when exchanged with a previously traced step in said best solution path; and replacing a previous step with said step and marking said previous step and all traced steps as untraced and mark said step as correct if said previous step is not correct and said step is correct when exchanged with said previous step in said best solution path.

11. The non-transitory computer-readable medium of claim 10, further comprising a step of creating a copy of said trace and on said copy, replacing said previous step with said step in said best solution path and marking only said step as correct and adding said copy to a queue of trace candidates to be later completed.

12. The non-transitory computer-readable medium of claim 7, wherein implicitly tracing further comprises:
   checking whether inserting a conflict step taken from a conflict set generated from said step conflict check would render said conflict step a correct production;
   deeming said conflict step as said unwritten mental step which is correct provided said conflict step is the correct production; and,
   appending said unwritten mental step to said student trace.

\* \* \* \* \*